(12) United States Patent
Chang

(10) Patent No.: US 7,839,393 B2
(45) Date of Patent: Nov. 23, 2010

(54) CONTROL DEVICE AND METHOD WITH COMPENSATION OF COORDINATE CALCULATING FOR A CAPACITIVE TOUCH PANEL

(75) Inventor: Chin-Fu Chang, Sijhih (TW)

(73) Assignee: Egalax_Empia Technology Inc. (TW)

( * ) Notice: Subject to any disclaimer, the term of this patent is extended or adjusted under 35 U.S.C. 154(b) by 1107 days.

(21) Appl. No.: 11/519,076

(22) Filed: Sep. 12, 2006

(65) Prior Publication Data

US 2007/0291011 A1 Dec. 20, 2007

(30) Foreign Application Priority Data

Jun. 20, 2006 (TW) .............................. 95122026 A

(51) Int. Cl.
*G06F 3/45* (2006.01)
(52) U.S. Cl. .................... 345/174; 345/173; 178/18.01; 178/18.02; 178/18.05
(58) Field of Classification Search ......... 345/173–179; 178/18.01–18.03, 18.05–18.07
See application file for complete search history.

(56) References Cited

U.S. PATENT DOCUMENTS

| | | | | |
|---|---|---|---|---|
| 5,940,065 A * | 8/1999 | Babb et al. | ................... | 345/178 |
| 6,333,736 B1 * | 12/2001 | Sandbach | ................... | 345/178 |
| 6,373,474 B1 * | 4/2002 | Katabami | ................... | 345/173 |
| 6,977,646 B1 * | 12/2005 | Hauck et al. | ................. | 345/173 |
| 7,355,592 B2 * | 4/2008 | Hong et al. | ................. | 345/173 |
| 7,362,313 B2 * | 4/2008 | Geaghan et al. | ............. | 345/173 |
| 2005/0041018 A1 * | 2/2005 | Philipp | ....................... | 345/178 |

* cited by examiner

*Primary Examiner*—Lun-Yi Lao
(74) *Attorney, Agent, or Firm*—Hershkovitz & Associates, LLC; Abraham Hershkovitz

(57) ABSTRACT

A control device for a capacitive touch panel has multiple voltage driving/current detecting circuits respectively connected to four corners of a top conductive layer of the touch panel. An auxiliary voltage driving/current detecting circuit is connected to a bottom conductive layer of the touch panel. When the touch panel is pressed, all voltage driving/current detecting circuits detect first current values at four corners of the top conductive layer. The auxiliary voltage driving/current detecting circuit also detects a second current value from the bottom conductive layer. The second current value is used to compensate all first current values so that the coordinate information of the position being pressed can be exactly calculated.

9 Claims, 6 Drawing Sheets

CONTROL DEVICE AND METHOD WITH COMPENSATION OF COORDINATE CALCULATING FOR A CAPACITIVE TOUCH PANEL

BACKGROUND OF THE INVENTION

1. Field of the Invention

The present invention relates to a control device and method with compensation of coordinate calculating, and more particularly to a control device and method that can exactly calculate coordinate information of a position being touched on a capacitive touch panel according to different impedance values of user who press the touch panel.

2. Description of Related Art

Most people often uses electronic devices equipped with a touch-controlled display in their daily lives, for example an automated teller machine or a copy machine. By slightly touching icons shown on the display, a user can easily operate the desired functions. The touch-controlled operation is provided by a transparent touch panel mounted on the surface of the display. The touch panels can be categorized to resistive type, capacitive type and surface wave type. When putting a finger on the resistive touch panel, a voltage signal occurs for calculating coordinate information of the touch point. For the capacitive touch panel, the coordinate information is obtained based on variations of electrical currents since a user's finger can absorb a minor current when touching the panel. Therefore, the coordinate information of the touching point can be calculated.

With reference to FIG. 3, the capacitive touch panel includes a transparent substrate (80) with flat surfaces, a top conductive layer (81) and a bottom conductive layer (82) respectively formed on the surfaces of the substrate (80), and isolating layers (83)(84) respectively formed on an outer surface of the top conductive layer (81) and the bottom conductive layer (82). Because the top conductive layer (81) and the bottom conductive layer (82) are made of conductive material, a capacitor exists between the two conductive layers (81)(82). Therefore, the AC signal input to the top conductive layer (81) can be conducted to the ground through the capacitor. In other words, even the user does not press the touch panel, the touch panel still has electrical currents flowing to the ground. With reference to FIG. 4, the AC signal is input to terminals a and b of the top conductive layer (81). Before been touched, the touch panel already has currents Ia and Ib flowing from the terminals a and b to the ground through the bottom conductive layer (82). When any user presses the touch panel at point P as shown in FIG. 5, the current variations at all corners of the top conductive layer (81) can be detected because human body absorbs a partial current (Ia1+Ib1) while another partial current (Ias, Ibs) flows to ground through the bottom conductive layer (82).

With reference to FIG. 6, if the voltage of the AC signal input to the touch panel is $V=V_o \sin(wt)$, the detected current values at terminals a and b are respectively expressed as $$I_A = Ias + Iat = Ias_0 \sin(wt+\phi 1) + Ias_0 \sin(wt+\phi 2)$$

$$I_B = Ibs + Ibt = Ibs_0 \sin(wt+\phi 1) + Ibs_0 \sin(wt+\phi 2).$$

At the terminals a and b, a phase difference ($\phi 1$, $\phi 2$) exist between the currents and the voltages. When any conductive object contacts the touch panel at point P, the voltage potential at the point P immediately has a change. Accordingly, the electric field and current distribution over the top conductive layer (81) also change. Changes of the current values and phases can be detected at each corner of the touch panel.

The current variations at the four corner of the top conductive layer (81) are assumed as $\Delta I_1$, $\Delta I_2$, $\Delta I_3$ and $\Delta I_4$ respectively. The total current absorbed by human body can be regarded as a summation of $\Delta I_1$, $\Delta I_2$, $\Delta I_3$ and $\Delta I_4$ when the user who touches the panel has a relative large resistance. The coordinate of the touching point is expressed by x and y:

$$x = \frac{(\Delta I_1 + \Delta I_2) - (\Delta I_3 + \Delta I_4)}{\sum_{i=1}^{4} \Delta I_i}$$

$$y = \frac{(\Delta I_1 + \Delta I_3) - (\Delta I_2 + \Delta I_4)}{\sum_{i=1}^{4} \Delta I_i}$$

If the impedance value (ZL) is relative small, a partial current will flow to ground. Thus the total current absorbed by human body can not be regarded as the summation of all current variations. In the situation that the user's impedance value (ZL) is relative small, coordinate calculating errors exist.

SUMMARY OF THE INVENTION

An objective of the present invention is to provide a control method with compensation of coordinate calculating for a capacitive touch panel to exactly calculate coordinate information of a point being pressed on the touch panel To achieve the objective, the method comprises the steps of inputting AC signals with an alternating amplitude to corners of the top conductive layer respectively; detecting first current values of the corners of the top conductive layer; detecting a second current value of the bottom conductive layer; compensating each detected first current value based on the second current value; and calculating coordinate data of a position being touched on the touch panel according to the compensated first current values.

Another objective of the present invention is to provide a control device with compensation of coordinate calculating for a capacitive touch panel.

The device mainly comprises an alternate current (AC) signal producing unit, which generates an AC signal with an alternating amplitude; multiple voltage driving/current detecting units, which receive the AC signal and are respectively connected to corners of the top conductive layer to output the AC signal to the corners, and respectively detect a first current value at each corner; an auxiliary voltage driving/current detecting unit connected to the bottom conductive layer to detect a second current value of the bottom conductive layer; multiple signal processing units respectively connected to the multiple voltage driving/current detecting units; and a central control unit connected to the AC signal producing unit and the signal processing units to receive output data of each signal processing unit to calculate coordinate of a point being touched on the touch panel.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
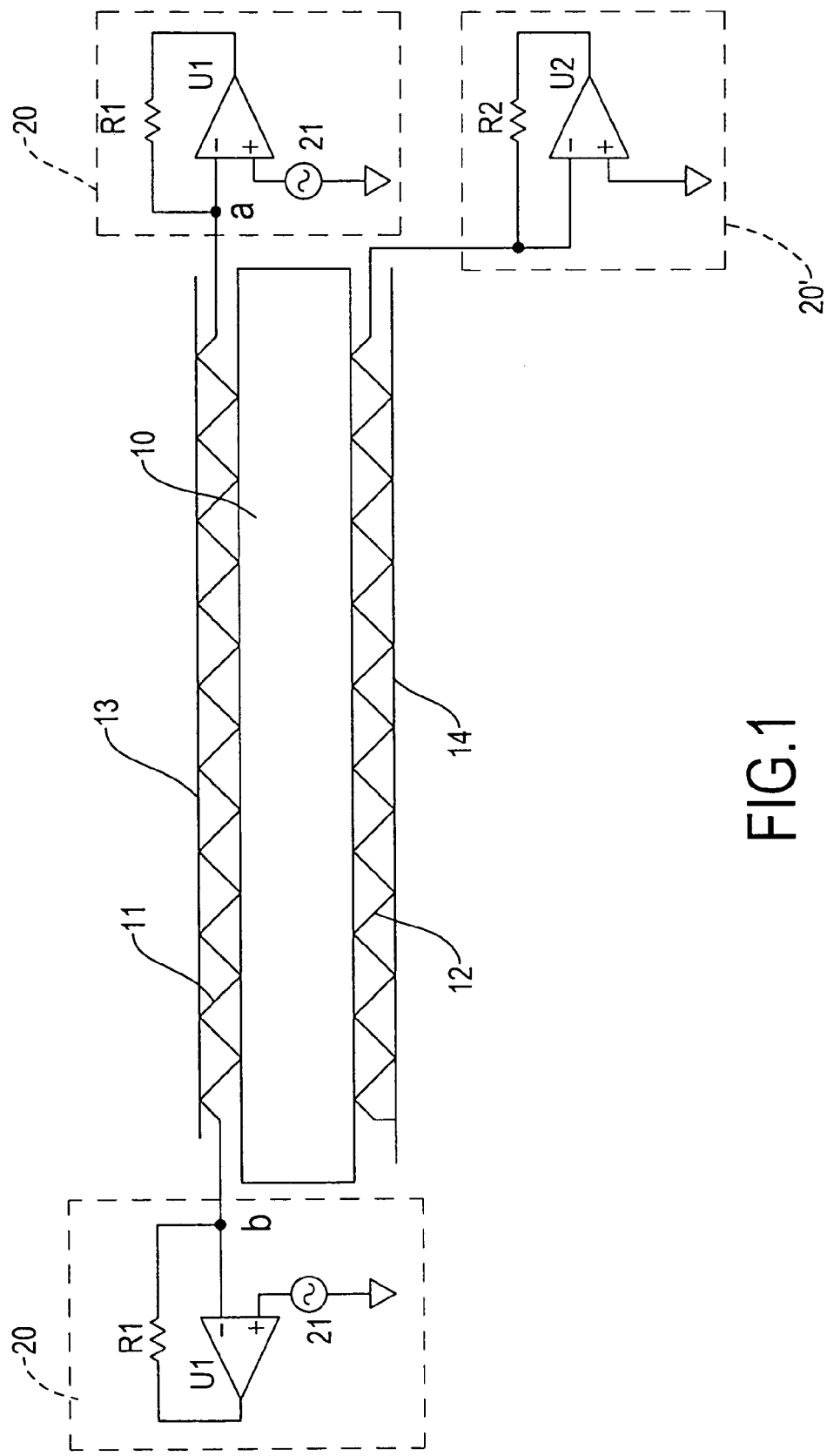
FIG. 1 shows a compensating device in accordance with the present invention applied to a capacitive touch panel.
Figure 2:
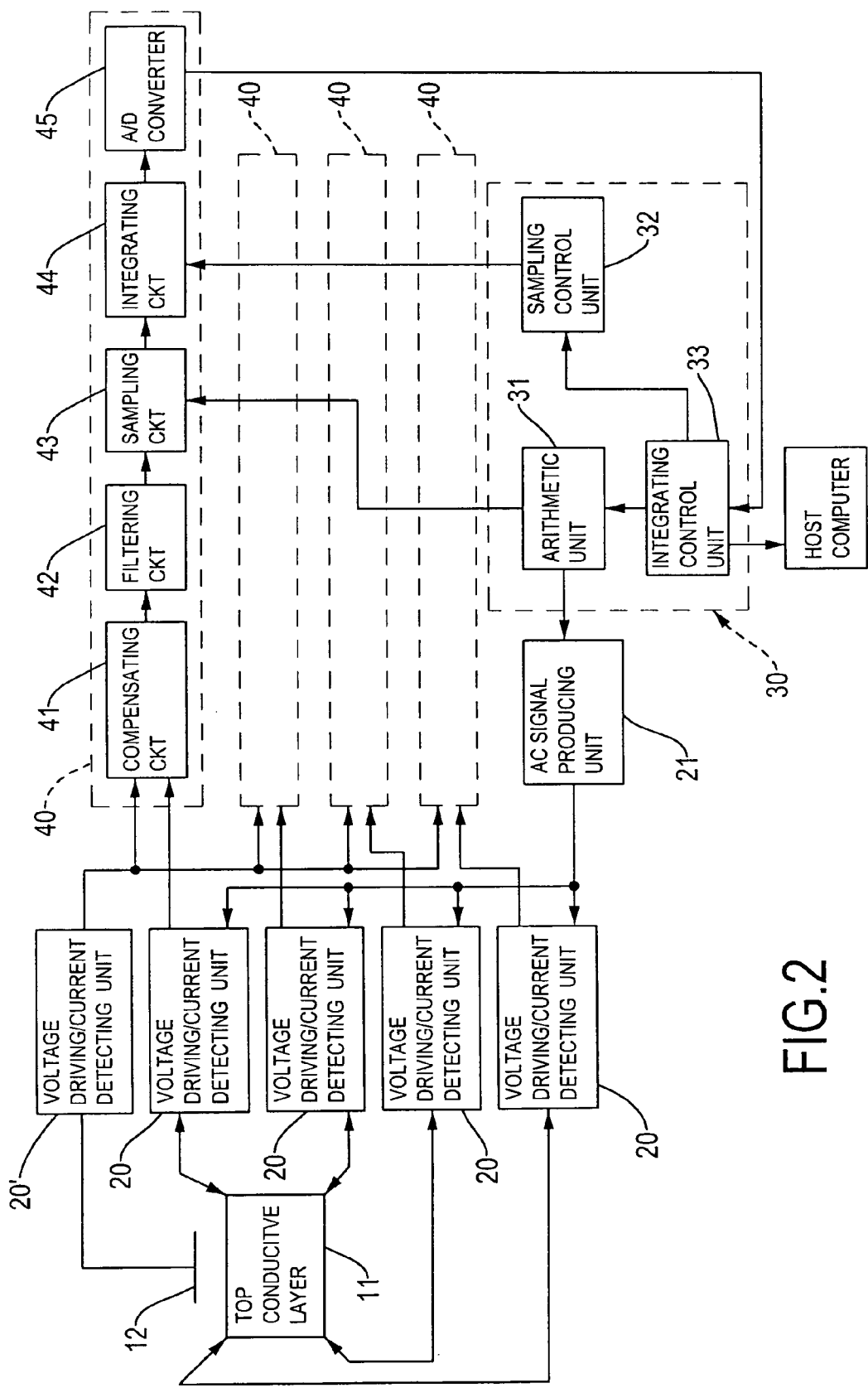
FIG. 2 is a block diagram of the present invention.
Figure 3:
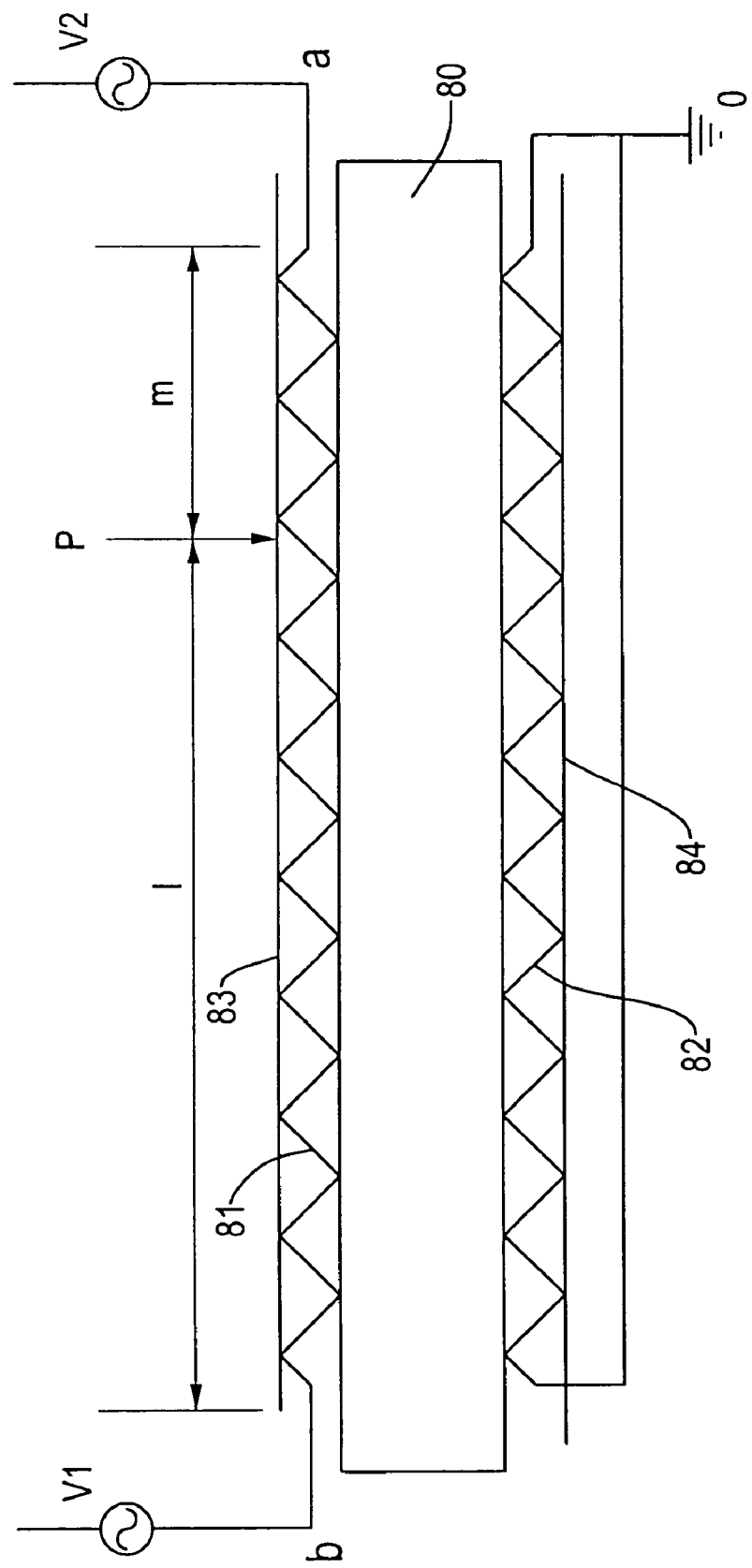
FIG. 3 is a side view of a conventional capacitive touch panel.
Figure 4:
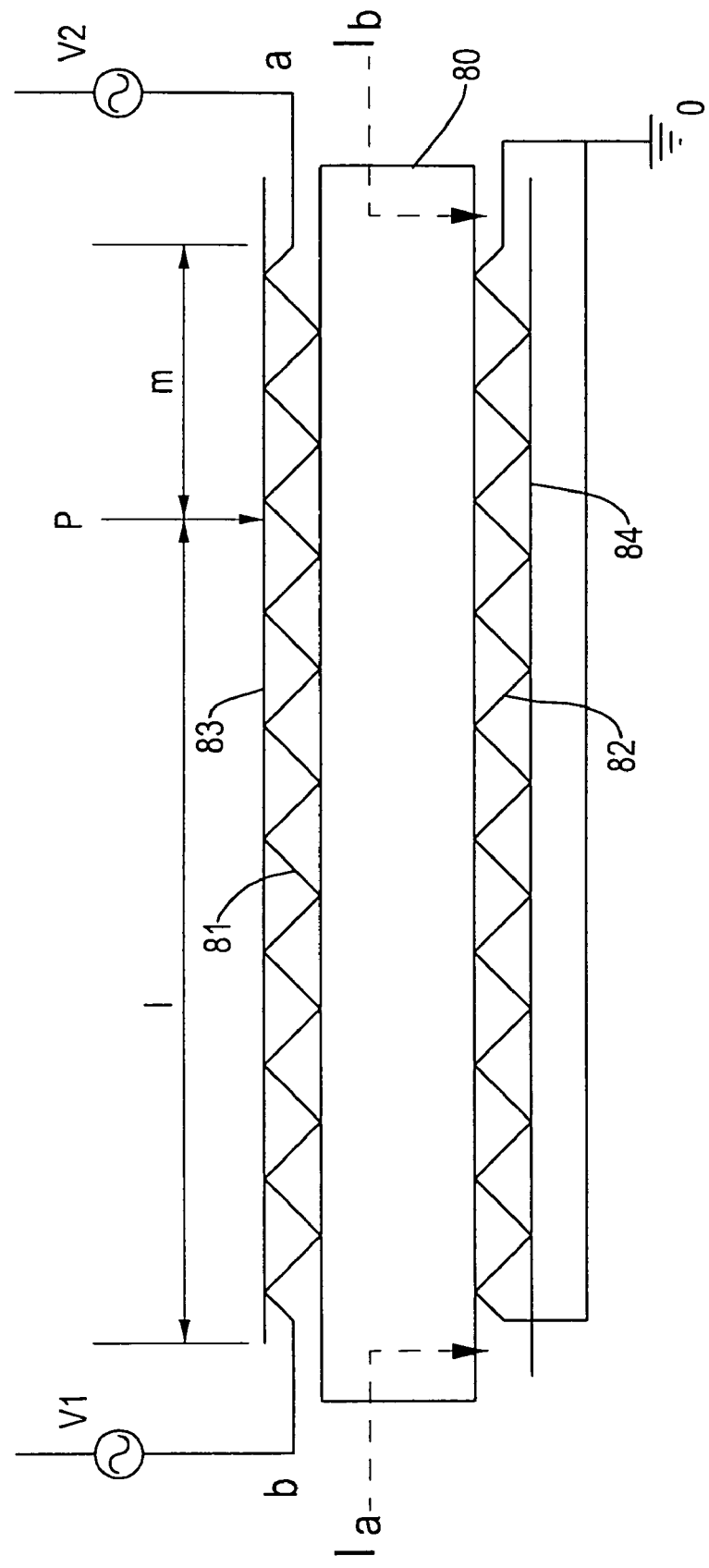
FIG. 4 is a side view of the conventional capacitive touch panel without being touched.
Figure 5:
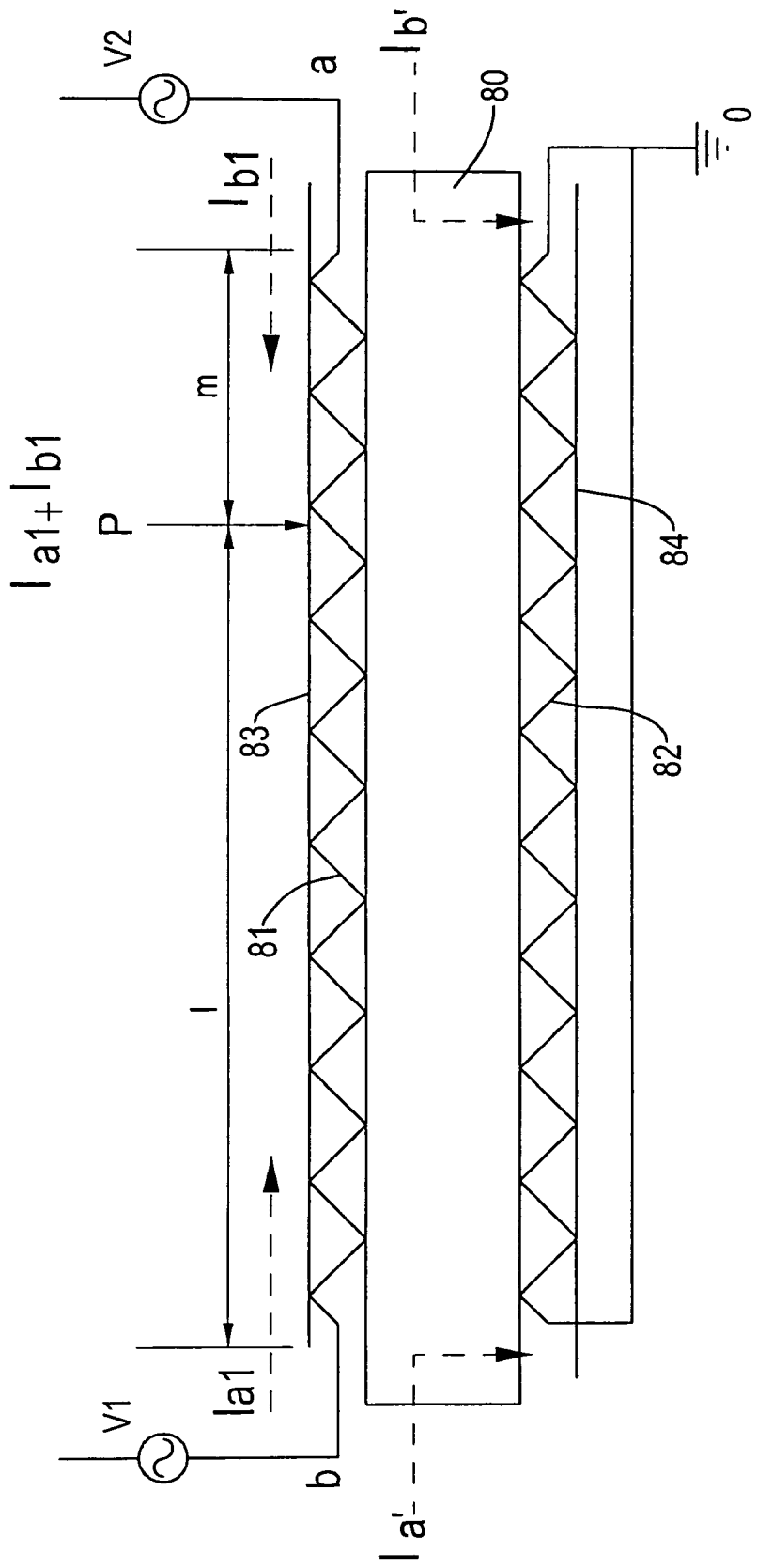
FIG. 5 is another side view of the conventional capacitive touch panel being touched.
Figure 6:
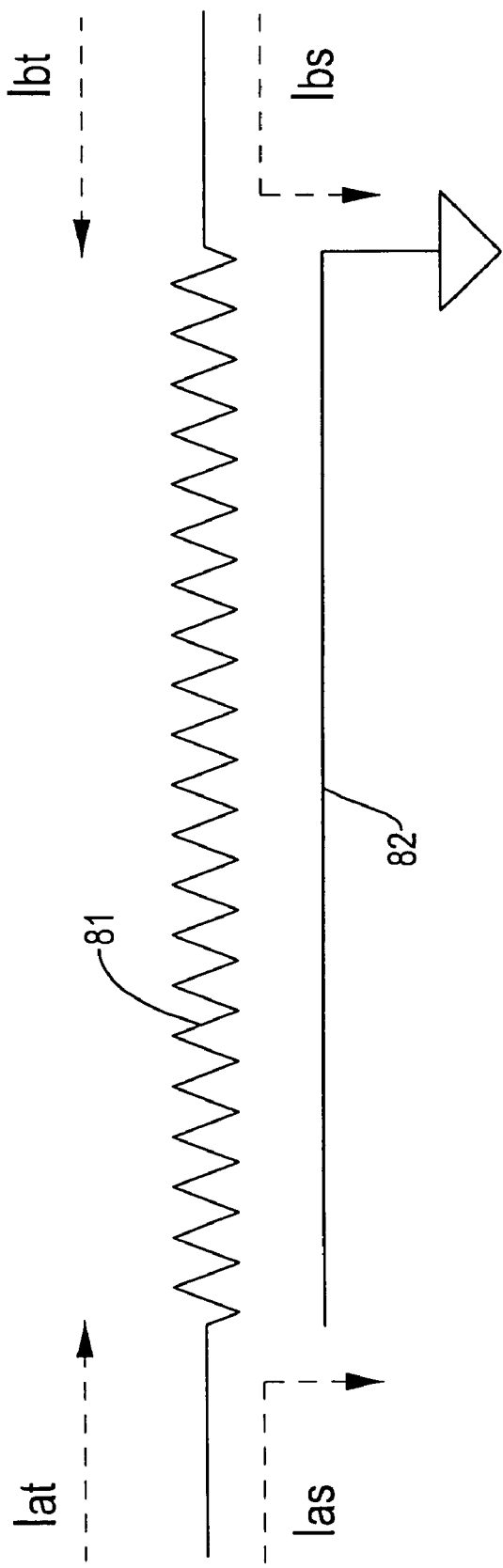
FIG. 6 is an equivalent model of a conventional capacitive touch panel.

With reference to FIGS. 1 and 2, a capacitive touch panel includes a transparent substrate (10) with flat surfaces, a top conductive layer (11) and a bottom conductive layer (12) respectively formed on the surfaces of the substrate (10), and two isolating layers (13)(14) respectively formed on an outer surface of the top conductive layer (11) and the bottom conductive layer (12).

Four voltage driving/current detecting units (20) respectively connect to four corners of the top conductive layer (11) of the capacitive touch panel. Each voltage driving/current detecting unit (20) comprises an operational amplifier (U1) and a feedback resistor (R1). The operational amplifier (U1) has a positive input terminal connected to an AC signal producing unit (21), and a negative input terminal connected to its output terminal through the feedback resistor (R1) to form a feedback loop. The negative terminal of the operational amplifier (U1) is used to connect to the top conductive layer (11). The current value at each corner of the top conductive layer (11) is measured using the feedback resistor (R1).

The bottom conductive layer (12) connects with an auxiliary voltage/current detecting unit (20'). The auxiliary voltage driving/current detecting unit (20') is also composed of an operational amplifier with a positive and a negative input terminal. However, the positive input terminal can be connected to either a signal ground or a constant DC level, not to the AC signal producing unit (21). The negative input terminal is connected to the output terminal of the operational amplifier through a resistor (R2) and is to be connected to the bottom conductive layer (12). The resistor (R2) is used to detect the current values at the corners of the bottom conductive layer (82). Because the capacitive touch panel is usually mounted on either an LCD display or a CRT display, the constant DC level is used in the embodiment to avoid any current interference on the bottom conductive layer (82) resulting from the display devices.

The foregoing voltage driving/current detecting units (20) (20') and the AC signal producing unit (21) further cooperate with the following circuits to calculate coordinate data of a point being pressed on the touch panel. The circuits comprise a central control unit (30) and multiple signal processing units (40). The signal processing units (40) are respectively connected to the voltage driving/current detecting units (20).

The central control unit (30), which is used as a data calculation/control core, comprises a sampling control unit (31) to control sampling frequency and time, an integrating control unit (32) and an arithmetic unit (33).

Each signal processing unit (40) is composed of a compensating circuit (41), a filtering circuit (42), a sampling circuit (43) connected to the output of the filtering circuit (42), an integrating amplifier (44) connected to the output of the sampling circuit (43), and an analog to digital (A/D) converting circuit (45) connected to the integrating amplifier (44). In this embodiment the compensating circuit (41) is formed by a subtracter having two input terminals and an output terminal. One input terminal of the subtracter is connected to a respective the voltage driving/current detecting unit (20), and the other input terminal is connected to the auxiliary voltage driving/current detecting unit (20'). The output terminal of the subtracter is connected to the filtering circuit (42). Using the compensating circuit (41), a current value detected from the bottom conductive layer (12) is subtracted from a current value that is detected at one corner of the top conductive layer (11). The subtraction result is output to the filtering circuit (42). The integrating control unit (32) controls a gain value of the integrating amplifier (44). The A/D converting circuit (45) is connected to the arithmetic unit (33) of the central control circuit (30) and is used to convert the compensated, filtered and amplified current value to a digital signal. The digital signal is output to the arithmetic unit (33) for coordinate calculation.

The AC signal producing unit (21) connects to all voltage driving/current detecting units (10), and is controlled by the arithmetic unit (33) of the central control unit (30). The AC signal producing unit (11) generates a AC signal with an alternating amplitude to be transmitted to the corners of the top conductive layer (11) through the voltage driving/current detecting units (10).

As mentioned above, a capacitor is formed between the two conductive layers (11)(12). Therefore, the AC signal applied to the top conductive layer (11) can be conducted to the ground through the capacitor. When any conductive object contacts the touch panel at a point, the voltage potential at the point immediately has a change. Accordingly, the electric field and current distribution over the top conductive layer (11) also change. Changes of the current values and phases can be detected at each corner of the touch panel. The current variations at all corners of the top conductive layer (11) can be detected by the voltage driving/current detecting unit (20). If the current variations at the four corner of the top conductive layer (11) are $\Delta I_1$, $\Delta I_2$, $\Delta I_3$ and $\Delta I_4$ respectively, the total current absorbed by human body can be regarded as a summation of $\Delta I_1$, $\Delta I_2$, $\Delta I_3$ and $\Delta I_4$ when the user who touches the panel has a relative large resistance. The coordinate of the touching point is expressed by x and y:

$$x = \frac{(\Delta I_1 + \Delta I_2) - (\Delta I_3 + \Delta I_4)}{\sum_{i=1}^{4} \Delta I_i}$$

$$y = \frac{(\Delta I_1 + \Delta I_3) - (\Delta I_2 + \Delta I_4)}{\sum_{i=1}^{4} \Delta I_i}$$

If the impedance value (ZL) is relative small, a partial current will flow to ground. Thus the total current absorbed by human body can not be regarded as the summation of all current variations. In the situation that the impedance value (ZL) is relative small, the compensating circuit (41) is used to compensate the coordinate calculating errors resulting from the impedance values of different users. The compensating method is described hereinafter.

When the voltage driving/current detecting units (20) respectively detect current values at the corners of the top conductive layer (11), the auxiliary voltage driving/current detecting unit (20') also detects the current value from the bottom conductive layer (12). Because the total current flowing to the bottom conductive layer (12) is a summation of all current variations of the top conductive layer (11), each compensating circuit (41) subtracts a quarter of the total current that flows to the bottom conductive layer (12) from its detected current value at each corner of the top conductive layer (11). The amount of current to be subtracted is controllable by the central control unit (30).

The compensated signal is then processed by the filtering circuit (42), the sampling circuit (43), the integrating amplifier (44) and the A/D converting circuit (45). The output digital data from the A/D converting circuit (45) are transmitted to the central control unit (30) that eventually calculates coordinate of the pressed point on the touch panel.

According to the present invention, the current signals detected from the top conductive layer (11) can be compensated by subtracting a partial current value detected from the bottom conductive layer (12). These compensated current signals are regarded as the real current absorbed by the human body. Therefore, the coordinate data of the touching point can be exactly calculated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A control method for a capacitive touch panel that has a substrate, a top conductive layer and a bottom conductive layer, the method comprising the steps of:
    applying AC signals with the same amplitude to corners of the top conductive layer respectively;
    detecting first current values of the corners of the top conductive layer;
    detecting a second current value of the bottom conductive layer;
    compensating each detected first current value based on the second current value,
    wherein a quarter of the second current value is subtracted from each of the first current values; and
    calculating coordinate data of a position being touched on the touch panel according to the compensated first current values.

2. A control device for capacitive touch panel that has a top conductive layer and a bottom conductive layer, the control device comprising:
    an alternating current (AC) signal producing unit, which generates an AC signal with an alternating amplitude;
    multiple voltage driving/current detecting units, which receive the AC signal and are respectively connected to corners of the top conductive layer to output the AC signal to the corners, and respectively detect a first current value at each corner;
    an auxiliary voltage driving/current detecting unit connected to the bottom conductive layer to detect a second current value of the bottom conductive layer;
    multiple signal processing units respectively connected to the multiple voltage driving/current detecting units, each signal processing unit comprising:
    a compensating circuit connected to an output terminal of a respective voltage driving/current detecting unit to compensate the first current value by using the second current value;
    a filtering circuit connected to an output terminal of the compensating circuit;
    a sampling circuit connected to an output terminal of the filtering circuit;
    an integrating amplifier connected to an output terminal of the sampling circuit; and
    an analog to digital (A/D) converting circuit connected to the output terminal of the sampling circuit;
    a central control unit connected to the AC signal producing unit and the signal processing units to receive output data of each signal processing unit to calculate coordinate of a point being touched on the touch panel.

3. The control device as claimed in claim 2, wherein the compensating circuit is a subtracter with two input terminals respectively connecting to one voltage driving/current detecting unit and the auxiliary voltage driving/current detecting unit.

4. The control device as claimed in claim 2, the central control unit comprising:
    a sampling control unit connected to the sampling circuit to control sampling frequency and time;
    an integrating control circuit connected to the integrating amplifier to control a gain of the integrating amplifier;
    an arithmetic circuit connected to the sampling control circuit, the integrating control circuit, the AC signal producing unit and the A/D converting circuit to control their operations, the arithmetic circuit further adapted to connect to a host.

5. The control device as claimed in claim 2, each voltage driving/current detecting unit comprising an operational amplifier with a positive input terminal, a negative input terminal and an output terminals, the positive input terminal connected to the AC signal producing unit, the negative input terminal connected to the output terminal through a feedback resistor and to be connected to the top conductive layer, wherein the first current value of the top conductive layer is measured using the feedback resistor.

6. The control device as claimed in claim 4, the auxiliary voltage driving/current detecting circuit comprising an operational amplifier with a positive input terminal, a negative input terminal and an output terminals, the negative input terminal connected to the output terminal through a feedback resistor, the output terminal connected to the compensating circuit, wherein the second current value of the bottom conductive layer is measured using the feedback resistor.

7. The control device as claimed in claim 5, the auxiliary voltage driving/current detecting circuit comprising an operational amplifier with a positive input terminal, a negative input terminal and an output terminals, the negative input terminal connected to the output terminal through a feedback resistor, the output terminal connected to the compensating circuit, wherein the second current value of the bottom conductive layer is measured using the feedback resistor.

8. The control device as claimed in claim 6, the positive input terminal of the operational amplifier of the auxiliary voltage driving/current detecting circuit connected to either a signal ground or a constant DC level.

9. The control device as claimed in claim 7, the positive input terminal of the operational amplifier of the auxiliary voltage driving/current detecting circuit connected to either a signal ground or a constant DC level.

* * * * *